S. J. STRID.
RELEASE RIGGING.
APPLICATION FILED MAY 28, 1913.
1,131,438. Patented Mar. 9, 1915.
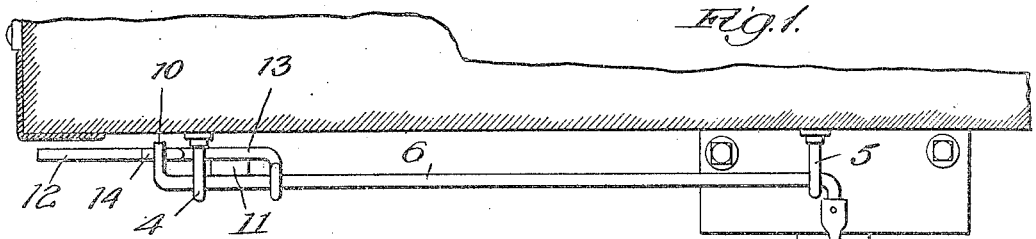
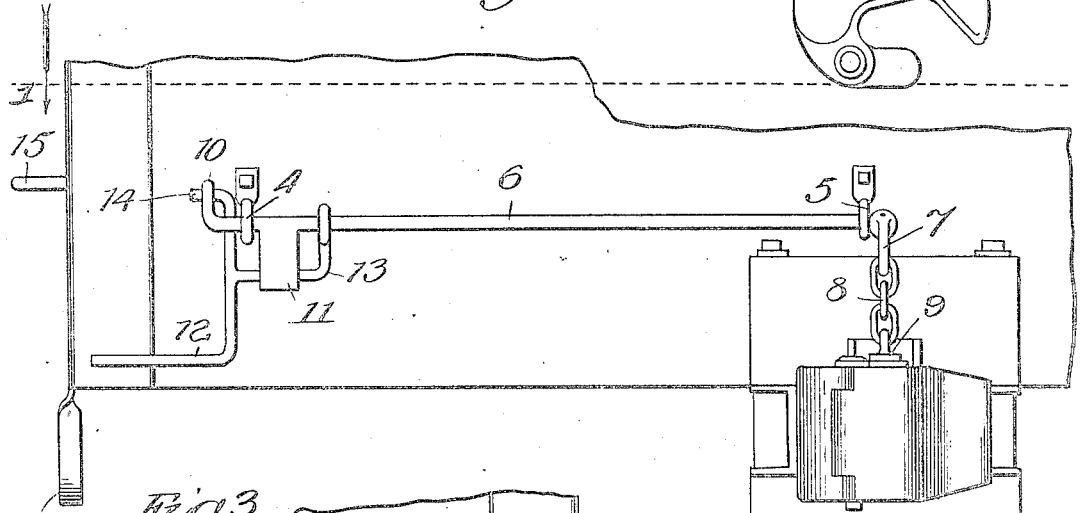
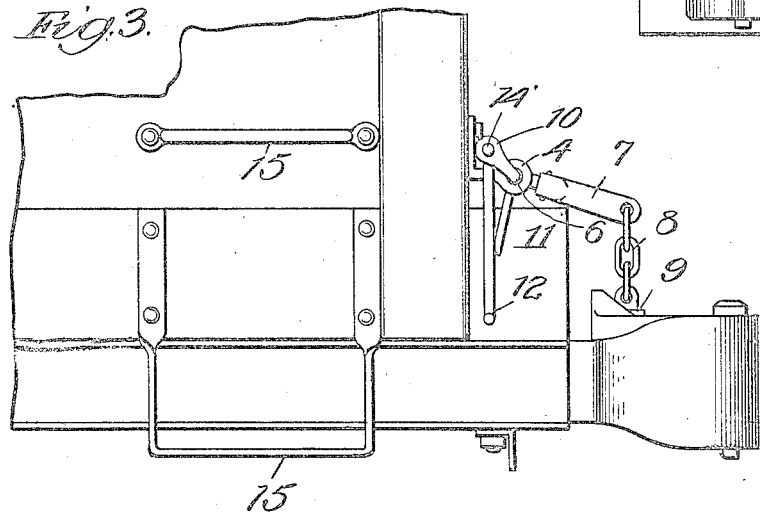
Witnesses:
Inventor:
Sven J. Strid,

UNITED STATES PATENT OFFICE.

SVEN J. STRID, OF CHICAGO, ILLINOIS, ASSIGNOR TO WALTER P. MURPHY, OF CHICAGO, ILLINOIS.

RELEASE-RIGGING.

1,131,438.  Specification of Letters Patent.  Patented Mar. 9, 1915.

Application filed May 28, 1913. Serial No. 770,422.

*To all whom it may concern:*

Be it known that I, SVEN J. STRID, a citizen of the United States, residing at 11,321 Curtis avenue, Chicago, in the county of Cook and State of Illinois, have invented a new and useful Improvement in Release-Rigging, of which the following is a specification.

My object is to provide a release-rigging for car-couplers, of a simple, strong and durable construction, whereby the brakeman, when standing at the side of the car, may effect the uncoupling by simply grasping and turning the handle, and whereby, when standing upon the ladder of the car, he may accomplish the same purpose by a simple downward pressure upon the handle with his foot.

In the accompanying drawings, which show my improved release-rigging, as I now prefer to construct it—Figure 1 is a plan view of the rigging mounted upon the end of a box-car; Fig. 2, a view of the same in elevation; and Fig. 3, a view of the rigging as it appears from the side of the car.

Journaled in bearing-brackets 4 and 5 on the end-sill of the car is a rock-shaft 6, provided at its inner end with a crank 7 connected, as by a chain 8, with the pin 9 of the coupler. On the outer end of the shaft 6 is a short perforated upwardly-extending crank 10, and adjacent thereto is a downwardly extending plate or arm 11.

The reference numeral 12 designates a loose crank or handle having an arm-portion 13 pivotally connected with the shaft 6 and extending behind the arm or plate 11. The handle 12 has an arm 14 pivotally engaging the perforation in the crank 10. When the brakeman stands at the side of the car, he may reach in and turn the handle 12 in the direction of the arrow in Fig. 3. This causes the part 13 of the handle to bear against the arm or plate 11 and rock the shaft 6 to cause the crank 7 and chain 8, to lift the pin 9 and release or unlock the coupling. When the brakeman is upon the ladder 15 of the car, downward pressure upon the handle 12 with his foot, draws down the crank 10 and rocks the shaft 6 to lift the crank 7, chain 8 and pin 9, to unlock or release the coupling. When released, the shaft 6 is returned to normal position by the weight of the crank 7 and attendant parts, thereby raising the handle 12 to normal position.

The foregoing description is intended to convey a clear understanding of my improvement in what I now believe to be the best and simplest form of its embodiment, and no undue limitation should be understood therefrom. It is my intention to claim all that is novel in my invention, and that the claims shall be construed as broadly as the prior state of the art may warrant.

What I claim as new and desire to secure by Letters Patent is:

1. In a release rigging for a car coupler, a horizontally rotatable shaft having one end operatively connected to the locking pin of a car coupler, a handle at the opposite end of said shaft, means connecting said handle to the shaft whereby the shaft is rotated when the handle is turned, an offset on said shaft, a connection between said handle and said offset whereby said shaft is rotated when said handle is depressed.

2. In a release rigging a rock shaft connected with the coupler at the inner end, a crank arm on the outer end of the shaft, an operating handle having an arm pivotally engaging the said crank on the shaft, and another arm extending inwardly and provided with an eye loosely engaging the said shaft intermediate the ends of said shaft.

3. In a release rigging for a car coupler, a horizontally rotatable shaft flexibly connected at one end with the locking pin of the coupler, an operating handle pivoted at two points, whereby the shaft is rotated and the locking pin is raised by a downward push of said handle, and an extension on said rod adapted to be engaged by said handle, whereby the shaft is rotated and said pin is raised when the handle is rotated.

4. In a release rigging, a rock shaft flexibly connected with the coupler at its inner end, a crank arm on the outer portion of said shaft, an operating handle pivotally engaging the shaft and said crank arm, whereby the shaft is rotated and the locking pin is operated by a downward push of said handle, said handle also engaging the rock shaft at another point whereby said shaft is rotated and the locking pin operated by an upward pull of said handle.

5. In a release-rigging for car-couplers, a rock-shaft, a connection between the rock-shaft and pin of the coupler, an axially movable raising and lowering handle for the shaft, a shoulder on the shaft in the path of axial turning of the handle, to be engaged thereby and rock the shaft when the handle is turned, to release the pin, the handle being eccentrically connected with the shaft whereby when depressed, it rocks the shaft and releases the pin, as and for the purpose set forth.

6. In a release rigging for car couplers, a horizontal rotatable shaft flexibly connected at one end with the locking pin of the coupler, a handle connected at two points to the opposite end of said shaft, one of said points being eccentric to the shaft, and the other of said points being concentric to the shaft.

7. In a release rigging for a car coupler, a rock shaft flexibly connected at one end with the locking pin of the coupler, a handle at the opposite end of said shaft having a two point suspension connection with said shaft and constructed to engage the shaft when turned axially, whereby the shaft is rotated when the handle is swung in an arc, and rotated when the handle is pushed downward in a substantially vertical plane.

8. In a release rigging for car couplers, a rock shaft connected at its inner end with the locking pin of the coupler, and having two oppositely disposed cranks in its outer end portion, and a single operating handle engaging said cranks whereby the rock shaft may be rotated by a downward movement of said handle or an outward pull of said handle and the lock pin operated.

SVEN J. STRID.

In presence of—
L. Heislar,
G. D. Steele.